Aug. 3, 1948.    P. H. ESBJORNSON    2,446,413
APPARATUS FOR BENDING HARD GRAINLESS FIBER SHEETS
Filed Dec. 2, 1942    8 Sheets-Sheet 1
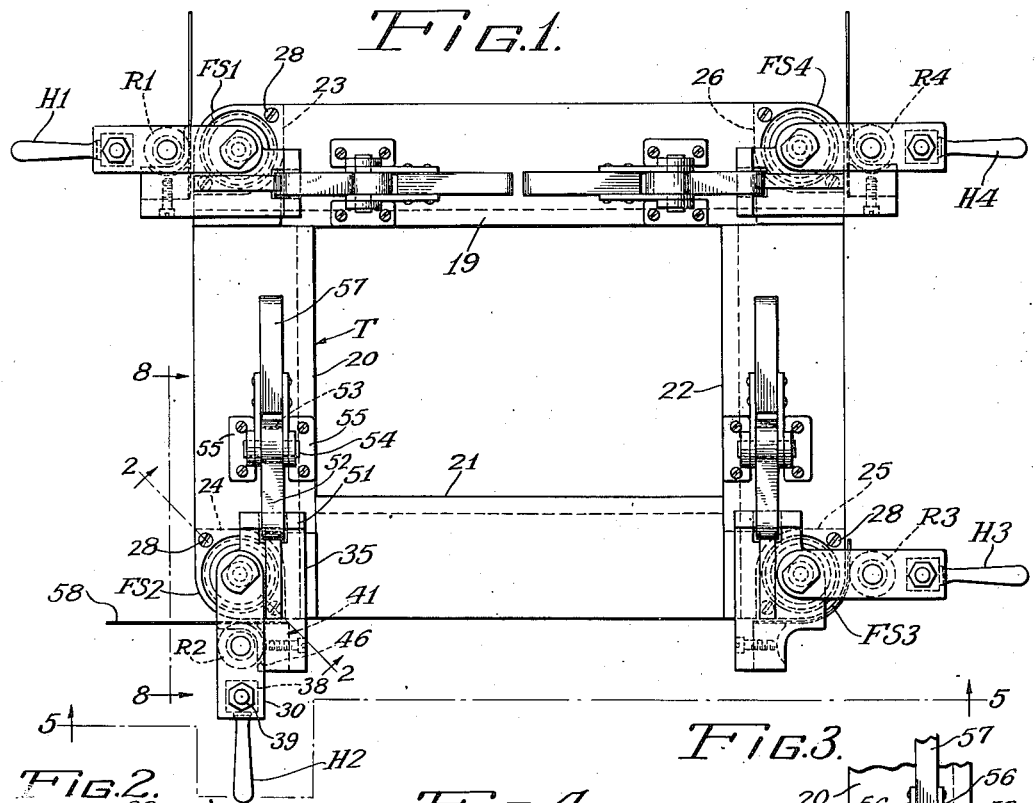
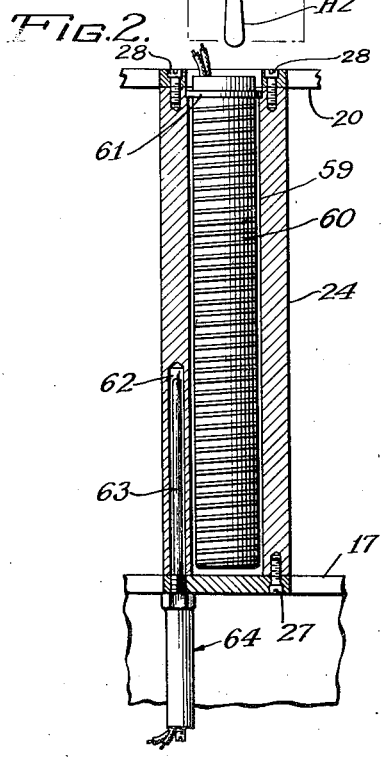
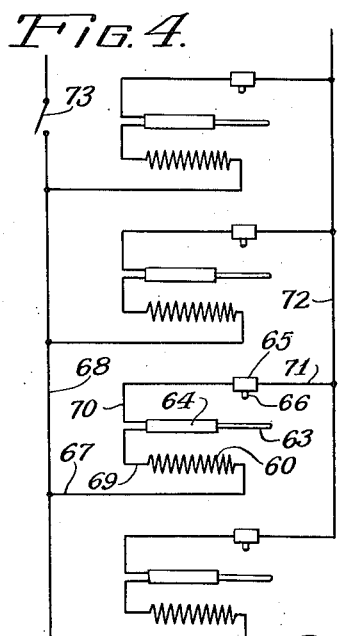
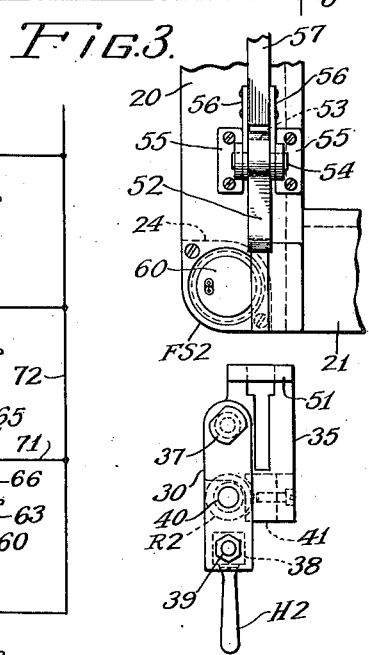
Inventor:
Per H. Esbjornson
By Wallace and Cannon
Attorneys Inventor:
Per H. Esbjornson
By Wallace and Cannon
Attorneys

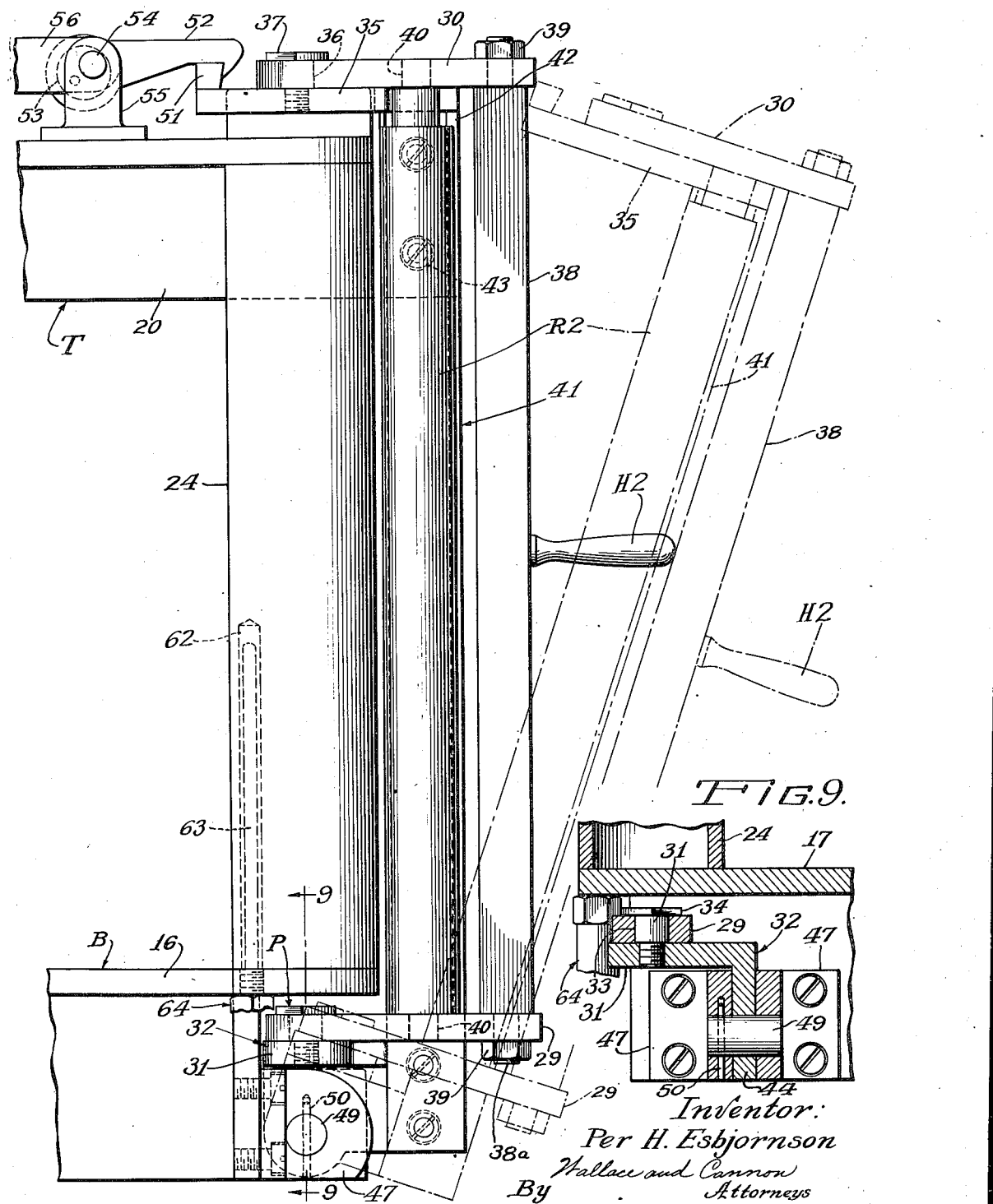

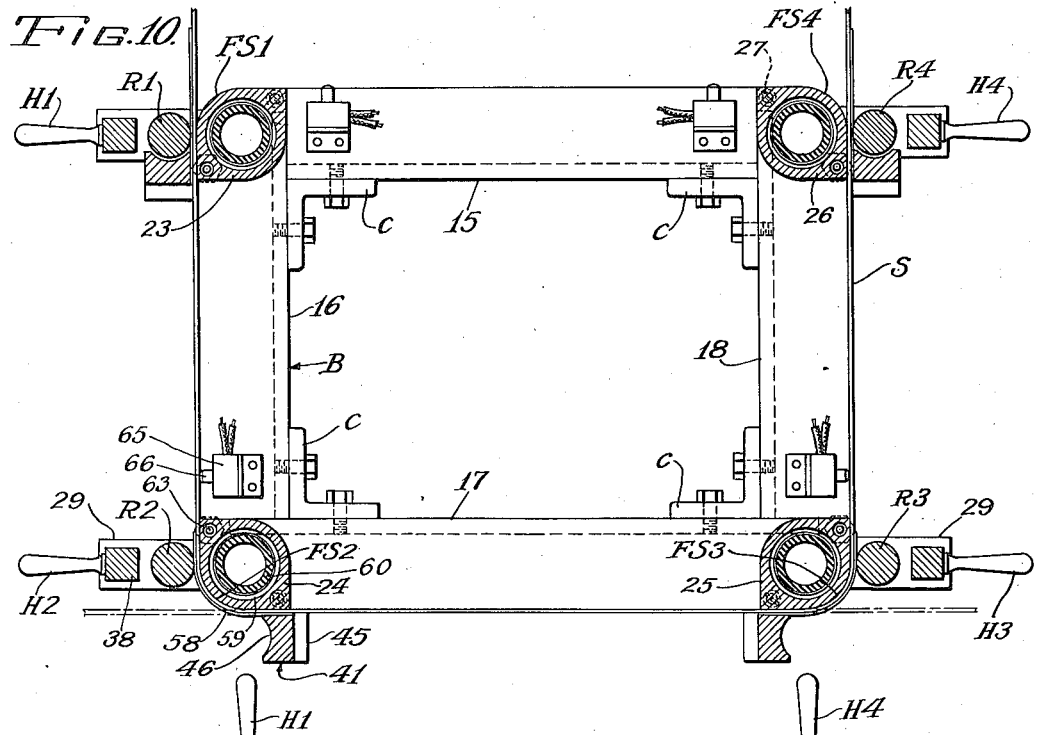
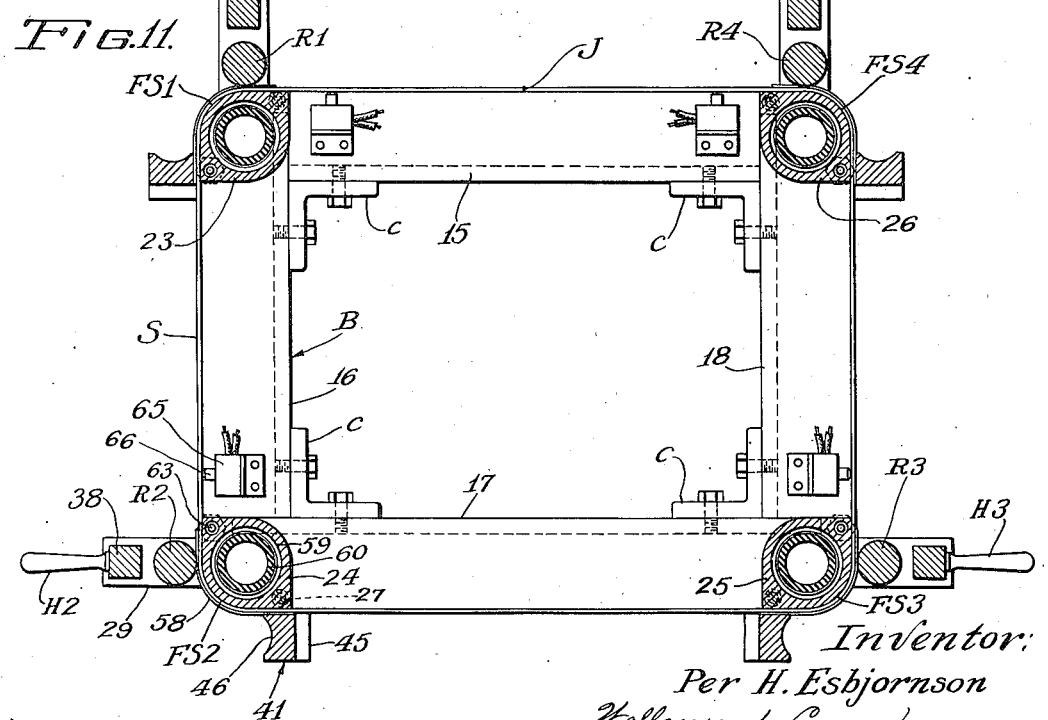

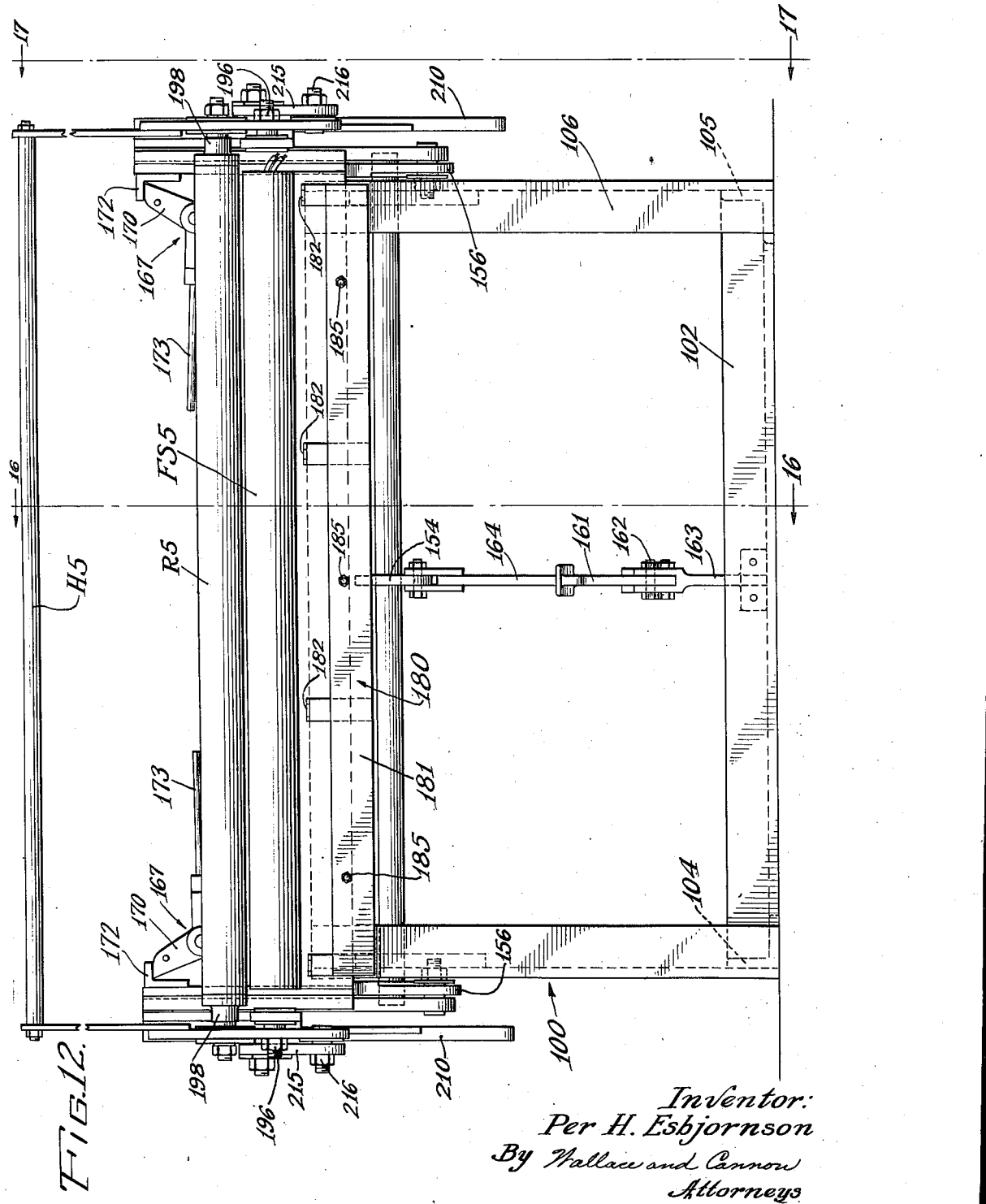

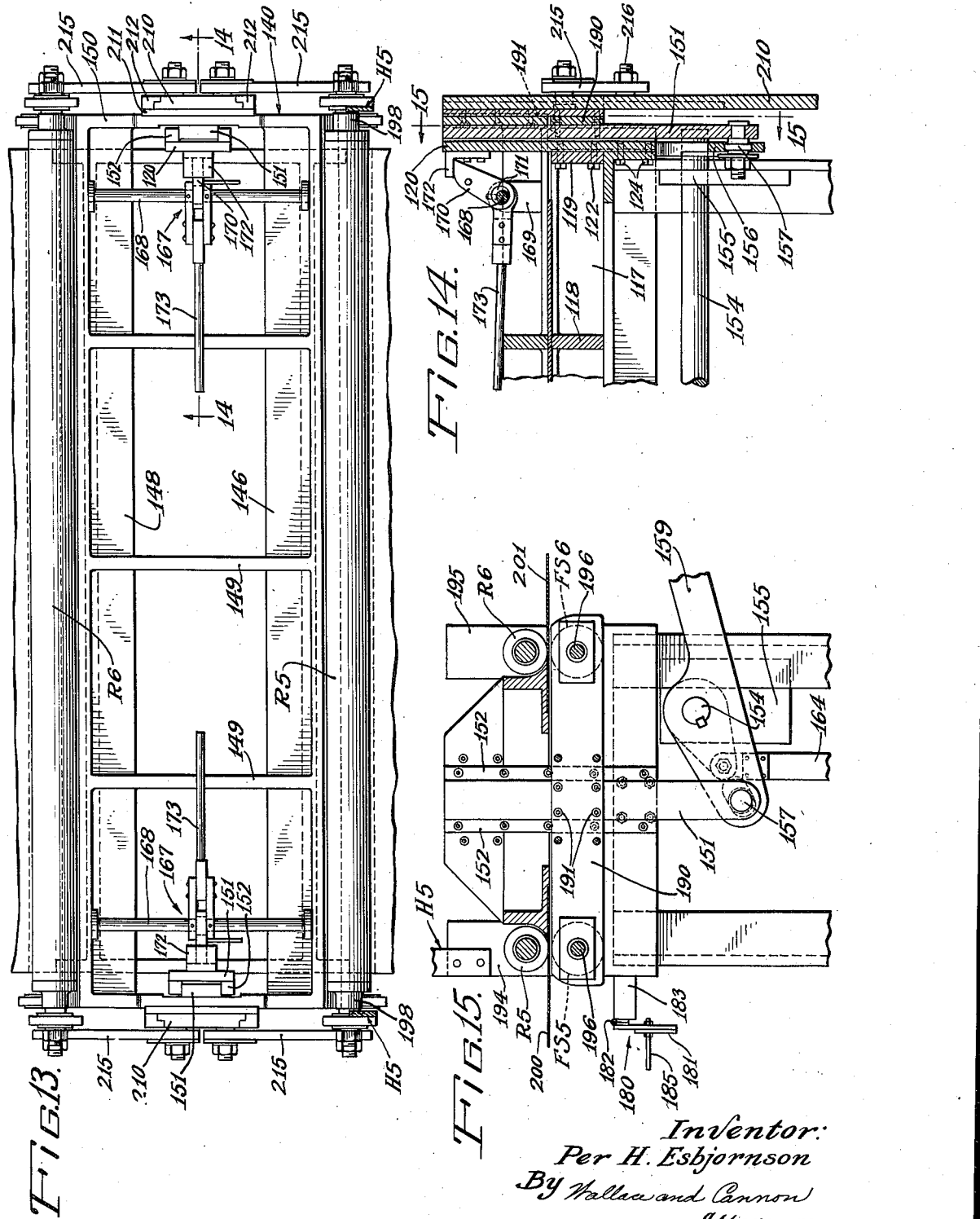

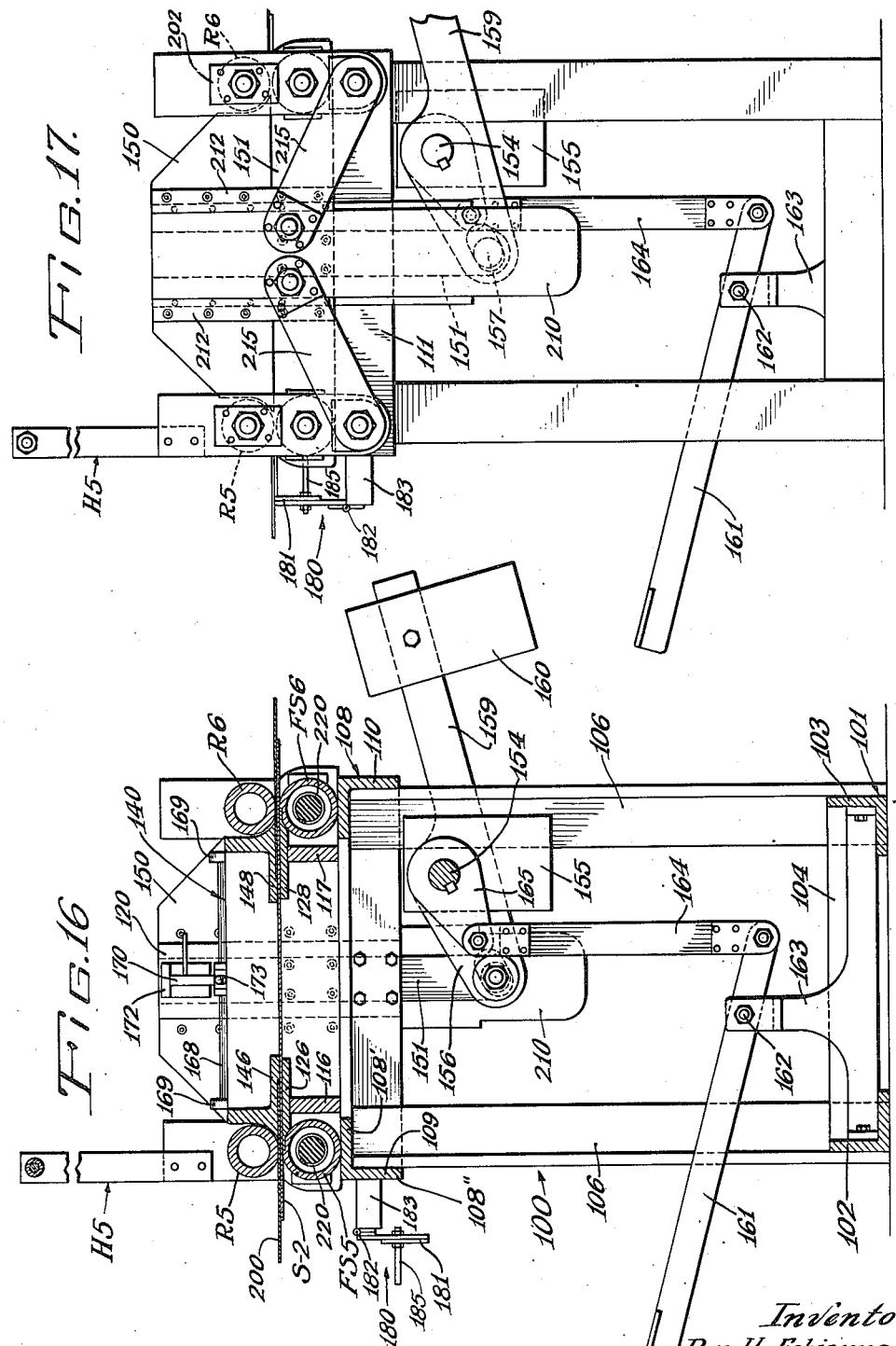

Aug. 3, 1948. P. H. ESBJORNSON 2,446,413
APPARATUS FOR BENDING HARD GRAINLESS FIBER SHEETS
Filed Dec. 2, 1942 8 Sheets-Sheet 8
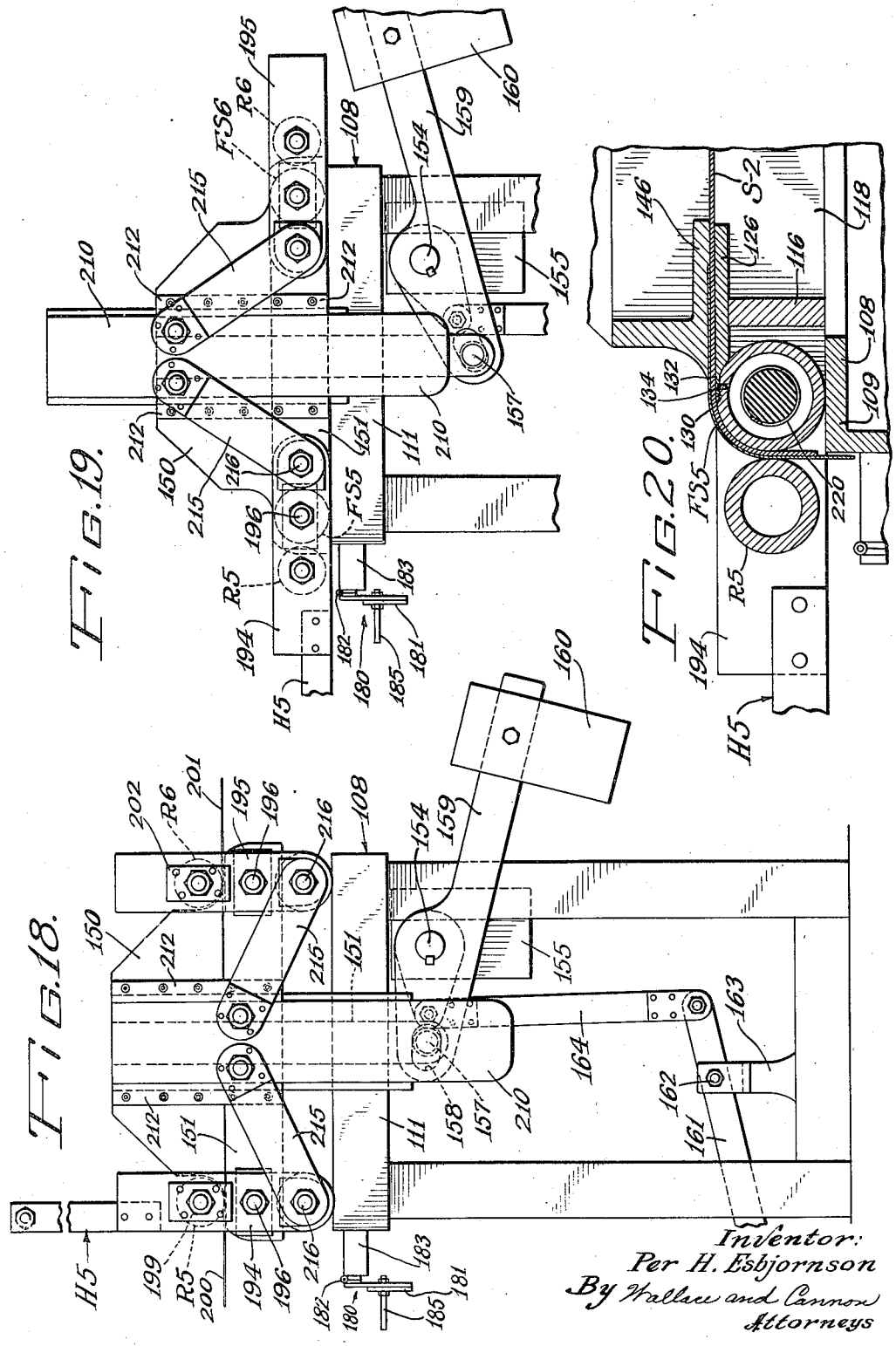
Inventor:
Per H. Esbjornson
By Wallace and Cannon
Attorneys Patented Aug. 3, 1948

2,446,413

UNITED STATES PATENT OFFICE 2,446,413

APPARATUS FOR BENDING HARD GRAINLESS FIBER SHEETS

Per H. Esbjornson, Wright, Minn., assignor to The Coolerator Company, Duluth, Minn., a corporation of Minnesota Application December 2, 1942, Serial No. 467,617

14 Claims. (Cl. 18—19)

This invention relates to the shaping or forming of hard, grainless fiber products made of ligno-cellulose materials, such as bagasse, wood, and the like, and particularly to the bending of sheets of such materials.

The sheet material, with the forming or shaping of which the present invention is concerned, has been commercially produced from different raw materials such as bagasse or wood, the latter raw material being processed as taught in the Mason Patent No. 1,663,505, patented March 20, 1928, to afford a coherent grainless, hard, dense, stiff and strong product having practically all of the characteristics of natural wood, but of greater density and without grain. This product is hereinafter referred to as being a ligno-cellulose material, and is usually formed and sold in flat, smooth surfaced sheets which in most instances have been utilized in their flat, original form. In some instances however, such sheets have formed or shaped as by bending of the sheets, but it has been possible to effect such formation only on relatively protracted radii which were too large to be useful in the construction of cabinets and the like, such as refrigerator cabinets. Hence, the primary object of this invention is to enable sheets of hard, grainless fiber material of the aforesaid character to be bent on relatively short radii whereby sheets so bent may be employed in the construction of cabinets and the like.

Relatively large sheets of fibrous material of the aforesaid character are commercially available, and these sheets are of such size that one or more walls of a cabinet of conventional size may be conveniently formed therefrom, and by way of example it is within the purview of my invention to utilize sheets of the aforesaid character for the purpose of forming one or more walls of a household refrigerator cabinet or the like. Moreover, since it is advantageous to avoid seams in the walls of cabinets and the like, I prefer to form a plurality of cabinet walls from a single sheet of fibrous material of the aforesaid character and to this end I so form or bend a sheet of material of this character that adjacent walls may be extended in angular relation with each other, desirably at right angles, and to enable such angular relation to be established between walls of a cabinet to be formed from a single sheet of material of the aforesaid character is among the important objects of my invention. Furthermore, an object related to the foregoing is to form a plurality of walls of a cabinet from a single sheet of material by arranging adjacent walls in angular relation with each other by bending the material at the places whereat the corners of the cabinet are to be formed, and a further ancillary object is to so bend a sheet of material of the aforesaid character that walls extending in substantially parallel relation with each, but joined to at least one interconnecting wall, may be formed from a single sheet of material of the aforesaid character.

Yet another object of the present invention is to enable a sheet of fibrous material of the aforesaid character to be heated in such a way that bending thereof may be effected and yet scorching or other damage to the material will be avoided; to insure the uniform application of pressure to a sheet of material of the aforesaid character when bending thereof is to be effected; to enable pressure to be so applied to a sheet of material of the aforesaid character that the likelihood of damage thereto or breakage thereof will be avoided in the course of bending of the material; and to enable a sheet of material of the aforesaid character to be disposed between relatively movable surfaces of which at least one embodies a configuration like that desired to be imparted to the sheet of material upon bending thereof and to effect such bending of the material upon relative movement between such members.

Still further objects of the invention are to so relate a plurality of devices operative to effect bends in a sheet of fibrous material of the aforesaid character that when a sheet of such material of predetermined size is arranged in the devices, bends may be formed therein in such a manner as to impart such configuration to the sheet of material that it will afford a plurality of walls of a cabinet or the like; to so arrange each of the devices located in related positions that a sheet of material of the aforesaid character may be expeditiously positioned therein; to arrange relatively movable parts in the devices for effecting bends in a sheet of material of the aforesaid character in such a way as to enable relative operative movement to be effected therebetween and also so as to enable relative separating movement to be effected therebetween whereby a sheet of material may be expeditiously installed therein and thereafter be retained in position to have a bending or like operation effected thereon; to effectively retain relatively separable parts in a device of the aforesaid character against undesired separation; to enable selected parts of devices of the aforesaid character to be heated and to so arrange the devices that the heated parts may be kept at a desired temperature; and to automatically interrupt heating of parts as aforesaid upon completion of a bending operation and thereby prevent scorching or other damage to the fibrous material.

I have found that bending or like formation of a sheet of fibrous material of the aforesaid character may be best effected when the material is moist, and thus yet another object of this invention is to effect bending or other formation of a sheet of material of the aforesaid character by resorting to a novel method for so doing entailing moistening of the sheet of material preferably at elevated temperatures and thereafter effecting bending of the material while driving the heated moisture therefrom and which also entails retaining the material when bent or otherwise formed to the desired configuration for a sufficient length of time to insure that the configuration imparted thereto will be retained therein.

A still further object of the invention is to provide a novel and efficient device of simple and economical construction which may be utilized for the purpose of bending or otherwise forming sheet material of the aforesaid character.

Other and further objects of the present invention will be apparent from the following description and claims and are illustrated in the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 1 is a plan view of a device embodying my invention;

Fig. 2 is a vertical sectional view taken substantially on the line 2—2 on Fig. 1;

Fig. 3 is a fragmentary plan view of certain relatively movable parts of the apparatus separated one from the other to thereby better illustrate the structural features thereof;

Fig. 4 is a wiring diagram showing the electrical connections employed in the device illustrated in Fig. 1;

Figure 5:
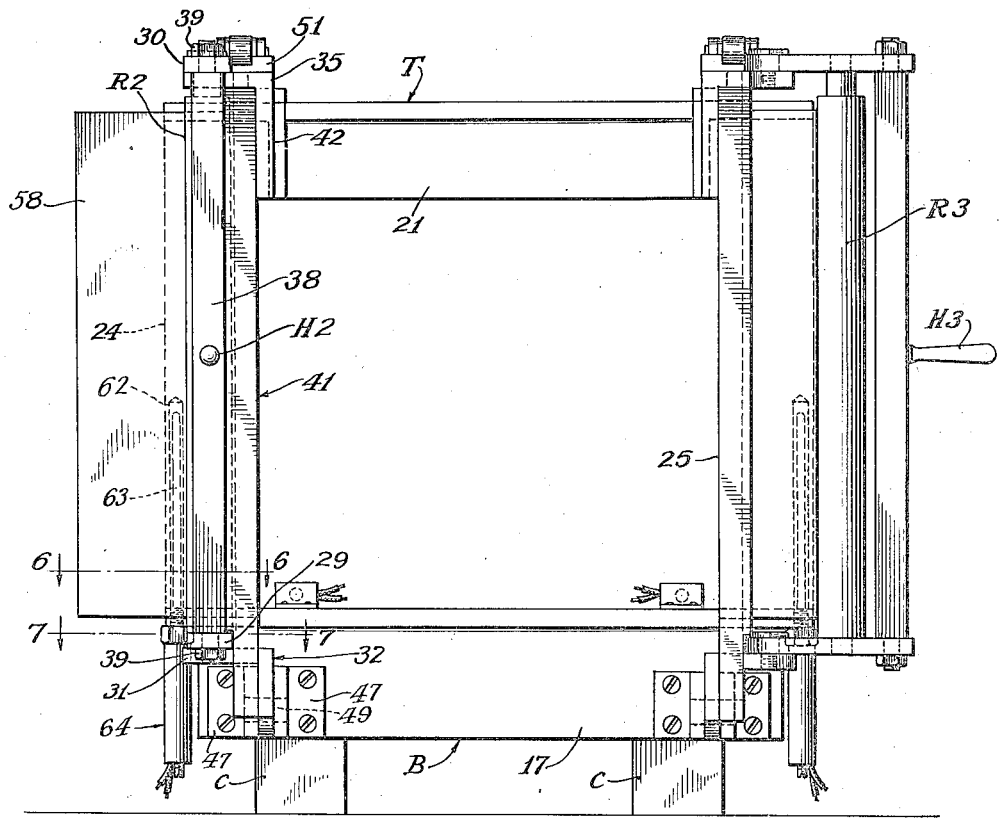
Fig. 5 is a side elevational view of the device taken on the line 5—5 on Fig. 1.
Figure 6:
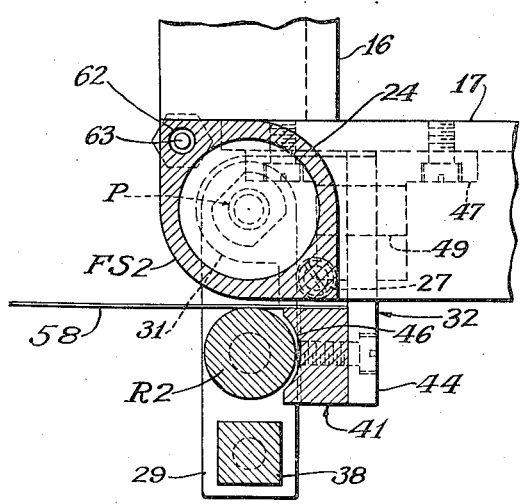
Figure 7:
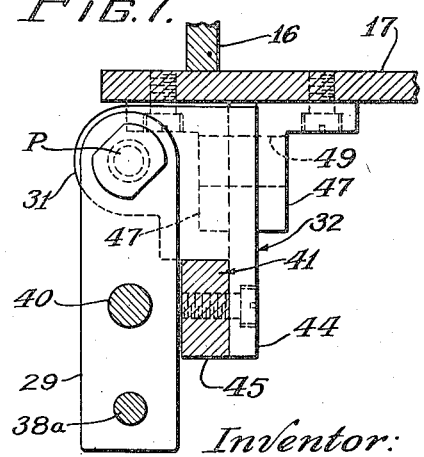

Figs. 6 and 7 are sectional detail views taken substantially and respectively on the lines 6—6 and 7—7 on Fig. 5;

Fig. 8 is a fragmentary vertical detail view taken on the line 8—8 on Fig. 1 and drawn to an enlarged scale and showing certain of the operative parts of my device in alternate positions;

Fig. 9 is a vertical sectional detail view taken substantially on the line 9—9 on Fig. 8;

Figs. 10 and 11 are horizontal sectional detail views showing certain operative parts of the apparatus in different operative positions assumed thereby in the course of imparting predetermined bends to a sheet of fibrous material of the character referred to hereinabove;

Fig. 12 is a front elevational view of another embodiment of my invention;

Fig. 13 is a plan view of the device shown in Fig. 12;

Fig. 14 is a fragmental vertical sectional view taken along the line 14—14 of Fig. 13;

Fig. 15 is a fragmental vertical sectional view taken along the line 15—15 of Fig. 14;

Fig. 16 is a vertical sectional view taken along the line 16—16 of Fig. 12;

Fig. 17 is an end elevational view taken from the line 17—17 in Fig. 12;

Fig. 18 is a view similar to Fig. 17 and showing the parts of the machine in position for loading or unloading of a sheet;

Fig. 19 is a view similar to Fig. 17 showing the parts in the positions occupied at the completion of a bending operation; and Fig. 20 is a transverse sectional view showing the parts in the same positions as in Fig. 19.

The embodiment of my invention illustrated in Figs. 1 to 11 of the accompanying drawings is particularly adapted for producing the side wall of a refrigerator cabinet of the top-opening type from a single sheet of material which initially is rectangular in outline and which desirably is sized along the shorter edges so as to afford a side wall of the desired height and which, along the longer dimensions, is so sized that four bends are formed in the material at what are to be the upright corners of the cabinet. The free ends of the sheet of material will be brought into abutting relation desirably midway along one of the side walls of the cabinet so that when these free edges are joined together in any desired way a unitary side wall for the refrigerator will be afforded. Moreover, the embodiment of the invention shown in Figs. 1 to 11 is arranged to produce the outer wall of a refrigerator or like cabinet, but it will be understood that a similar arrangement could be utilized for providing the inner wall or liner of a refrigerator or other cabinet such as is customarily arranged in spaced relation with the outer wall, whereby suitable insulation or the like may be arranged between the two walls for the purposes well understood in the art. Furthermore, while this embodiment of the invention is arranged to form the material so as to define vertically extending corners in the cabinet wall that is produced in the illustrated form of the apparatus, it will be apparent from the following description that the arrangement might be utilized to produce corners adapted to extend horizontally, and other ways in which the illustrated forms of the invention may be put to use will also be apparent from the following description.

As shown in Figs. 1 to 11 of the accompanying drawings, the apparatus includes a base B formed in the present instance from four strips of angle iron 15, 16, 17 and 18, Figs. 10 and 11, related one to the other to afford a substantially rectangular base. In this embodiment of the invention the strip of angle iron 17 is somewhat longer than the remaining strips, whereby corresponding ends of the strips 16 and 18 may be abutted against the flanged or inwardly disposed side of the strip 17 and desirably the ends of the strips 16 and 18 which abut the strips 17 are welded together. The strip 15 is disposed to extend between the flanged or inwardly disposed faces near the free ends of the strips 16 and 18 with the flanged side of the angle iron 15 disposed inwardly, and the ends of the strip 15 are welded or otherwise suitably secured to the portions of the strips 16 and 18 against which the ends of the strips 15 are abutted. It will be understood that while the foregoing is an advantageous way of affording a base for the apparatus, resort could be had to other base constructions without departing from the purview of the present invention. Moreover, since it may often be desirable to support the base B in spaced relation with a floor, bench or other support on which it may be rested, angle clips C may be bolted or otherwise secured to abutting flanged portions of the base portion to project beneath the flanges on the angle strips, as shown in Fig. 5, whereby additional means for securing abutted portions of the angle strips together are afforded, and it will be understood that in some instances where angle clips as C are utilized it will not be necessary to weld abutting ends of the angle strips together although rigidity of the base portion will be promoted if resort is had to such welding.

The apparatus also includes a top frame T formed from angle strips 19, 20, 21 and 22, Fig. 1. These angle strips have the end portions thereof related one to the other in the manner in which the ends of the angle strips 15, 16, 17 and 18 are related one to the other, and the flanges on the angle strips 19, 20 and 21 are disposed to depend downwardly inwardly of the rectangle formed by abutting the ends of these angle strips and desirably abutting ends of the angle strips are welded one to the other to thereby afford a rigid top frame.

Posts 23, 24, 25 and 26 are disposed at the corners of the rectangular base B and the rectangular top frame T and each post as 24, Fig. 8, is disposed to extend upwardly from the upper flat face of an angle strip as 17 to the underside of the horizontally disposed portion of an angle strip as 20 at the top of the frame, and machine screws as 27, Fig. 2, pass through the horizontally disposed portions of the angle strips of the base B into the posts to secure the same in position, while machine screws as 28, Fig. 2, are passed through the horizontally disposed portions of the angle strips of the frame T to pass into the posts and thereby the posts serve to support the top frame T from the base B, and the frames and posts are rigidly secured together.

Where, as in the present instance, all four walls of a cabinet are to be formed from a single sheet of fibrous material by bending the material to thereby define the corners of the cabinet construction, it will be understood that the frames afforded by the base as B and the top frame as T will be sized, in so far as the outer dimensions thereof are concerned, to correspond to the inner dimension desired in the cabinet to be formed from such a single sheet of material. Moreover, since fibrous material that is adapted to be formed in a device of the present invention must be formed or bent on a radius, formed surfaces as FS1, FS2, FS3 and FS4 are provided on the portions of the posts 23, 24, 25 and 26 disposed at the corners of the rectangle defined by the inner connected frames B and T and, as best shown in Figs. 1 and 10, for example, the portions of the angle strips of the frames B and T aligned with the formed surfaces as FS1 on the posts are similarly formed. Desirably, the formed surfaces as FS1 are formed on a relatively short radius whereby relatively sharp bends may be formed in the sheet of fibrous material and in each instance the radius on which the formed surfaces as FS1 is formed will be related to the thickness of the sheet material that is to be bent in the apparatus. For example, in an instance where the sheet material is of the nature to which Mason Patent No. 1,663,505 pertains and the sheet of material is about one-eighth inch in thickness, resort may be had to a radius of approximately one and one-third inches in forming a surface as FS1. In this respect, however, it will be understood that this is merely exemplary and that under varying conditions resort might be had to radii of somewhat different lengths even in an instance where the material is about one-eighth inch in thickness. Desirably, however, the radius in each instance will be such that consistently good results will be obtained when the sheet material is bent thereabout for in all instances it is intended that rupture or other injury to the material will be avoided.

In order to impart a configuration to the sheet material similar to the configuration of each formed surface as FS1, means are provided to force the sheet material into engagement with such a formed surface, and in the present instance such means are arranged to uniformly apply pressure to the sheet material, particularly at the immediate point of bending, for so to do mitigates against the likelihood of sheet material becoming damaged in the course of bending thereof. To this end rollers R1, R2, R3 and R4 are respectively arranged for cooperation with the formed surfaces FS1, FS2, FS3 and FS4.

In order that each roller as R2 may be moved relative to a formed surface as FS2 with which it is to cooperate, each such roller is supported in a pivotally mounted frame. By referring to Figs. 8 and 9 it will be seen that the frame for the roller R2, which corresponds to the frame provided for the other rollers, includes a bottom arm 29 and an upper arm 30 which, as will be explained, are pivotally mounted in alignment with the vertical axis of the formed surface FS2. To this end the arm 29 is pivotally mounted, as indicated at P, Figs. 6 and 7, on a horizontally extending flange 31 of an angle bracket 32, Figs. 5, 6, 7, 8 and 9, which, in a manner and for a purpose explained presently, is hingedly connected to the angle plate 17. Thus, an opening 33, Fig. 9, is provided in the arm 29 and a shouldered machine screw 34 has a cylindrical surface thereon disposed in this opening, the machine screw 34 being fitted into the horizontally extending ledge 31 of the bracket 32 and the head thereof being disposed to hold the arm 29 on the upper face of the ledge 31 of the bracket 32. The upper arm 30 is pivotally connected to a clamp plate 35, Figs. 1, 3 and 8, this clamp plate being described in further detail hereinafter. An opening 36, Fig. 8, is provided in the arm 30 and a shouldered machine screw 37 includes a cylindrical portion which is mounted in this opening, the machine screw being fitted into the clamp plate 35 and the head thereof being effective to retain the arm 30 in engagement with the upper surface of the clamp plate 35.

The arms 29 and 30 are of sufficient length to project well beyond the formed surface FS2 and the free ends thereof are tied together by a bar 38 that is extended between the inwardly disposed faces of the arms 29 and 30 and which includes reduced end portions passed through aligned openings in the arms 29 and 30, the reduced end portions as 38a, Fig. 7, being screw threaded for the reception of nuts 39, Fig. 8, which, when tightened, are effective to clamp the arms 29 and 30 together, whereby the arms 29 and 30 and the bar 38 afford a frame pivotal about the vertical axis of the post 24. A handle H2 is provided on the bar 38 for a purpose explained presently.

The roller R2 includes reduced end portions as 40, Figs. 3 and 8, which are respectively mounted in openings in the arms 29 and 30, whereby the roller R2 is connected to the arms 29 and 30 intermediate the bar 38 and the pivotal mountings of these arms, the roller R2 being rotatable in the arms 29 and 30. Moreover, the roller R2 is mounted in the arms 29 and 30 in such position as to be related to the associated formed surface as FS2 and the roller is so sized and is desirably so spaced from the formed surface FS2 that a sheet of material of the aforesaid character of predetermined thickness may be neatly accommodated therebetween when a clamp plate, explained presently and associated with the roller R2, is arranged intermediate the sheet of material as S and the roller as R2 when the sheet of material is engaged with the formed surface FS2.

The frame including the arms 29 and 30 and the bar 38 also includes a stop bar 41 which defines the normal at rest position of the roller R2 and which also acts to clamp the sheet as S against the flat surface of the related post adjacent to the formed surface of the post. The upper end of the bar 41 is secured to a lug 42, Figs. 5 and 8, that depends from the clamp plate 35, the rear side of the bar 41 being fast to the face of the lug 42 by machine screws 43, Fig. 8, or the like. The lower end of the bar 41 is fast to the flange 44 of the angle bracket 32, which depends in angular relation with the flange 31 thereof and which, as best shown in Fig. 6, projects beyond the adjacent face of the post 24, the lower end portion 45, Fig. 7, of the bar 41 being relieved to enable the arm 29 to be brought into its normal at rest position shown in Fig. 7. The face of the bar 41 opposite that secured to the lug 42 and the arm 44 is recessed, as indicated at 46, Figs. 1 and 6, so that the roller R2 may be fitted thereinto when this roller is in its normal at rest position which is shown in Fig. 1.

In order that a sheet of fibrous material of the aforesaid character may be expeditiously fitted between a roller as R2 and a formed surface as FS2, the frame of which the arms 29 and 30 and the bars 38 and 41 are a part is arranged so that it may be pivoted on the base B from the full-line position shown in Fig. 8 into the broken-line position shown in this view. To this end a pair of angle clips 47 and 48 are secured to the depending portion of the angle strip 17, as shown in Fig. 9, to have the branches thereof spaced apart whereby the arm 44 of the angle clip 42 may be fitted therebetween. Aligned openings are provided in the arms of the angle clips 47 and the arm 44 to receive a bearing pin 49 which, by means of a retaining pin as 50 or the like, is held against displacement from these openings. Thus the angle bracket 42 is pivotally connected to the strip 17 and it may therefore be pivoted about the pin 49 from the full-line position thereof shown in Fig. 8 into the broken-line position thereof shown in this view, whereupon the frame of which the arms 29 and 30 and the bars 38 and 41 are a part assumes the broken-line position shown in Fig. 8.

It is essential, however, when the parts are in the full-line position shown in Fig. 8, that they be held rigidly in position so as to hold the sheet as S in the desired clamped relation to the related post, and to this end a chamfered lug 51, Figs. 1, 3, 5 and 8, is provided on the clamp plate 35 at the inner end thereof, the inwardly disposed face of this lug being chamfered as shown in Fig. 8. A clamp hook 52 is pivotally mounted on the eccentric 53 that includes a bearing pin 54 that is rotatably mounted in the brackets 55 that are secured to the upper face of the strip 20. As best shown in Figs. 1, 3 and 8, two plates 56 have corresponding end portions thereof interposed between the eccentric 53 and the upstanding portions of the brackets 55 and a handle 57 is secured between the opposite ends of these plates. When the handle 57 is grasped and pivoted away from the upper surface of the plate 20, the eccentric 53 is so rotated that the hook end of the clamp hook 52 is first moved away from the chamfered surface on the lug 51 so that it may thereafter be pivoted upwardly, and when this end of the clamp hook 52 is pivoted upwardly the frame of which the arms 29 and 30 are a part may be pivoted into the broken-line position in which such a frame is shown in Fig. 8. When the clamp hook 52 is in its operative relation, the roller as R2 and the stop bar 41 are held in positions such that the sheet S is held in a firmly clamped relation to the opposed tangential surface of the post as 24.

It will be understood that a support such as that afforded for the roller R2, and which has been described hereinabove, is provided for each one of the rollers, wherefore each of these rollers may be disposed in a normal at rest position to be seated in a recess as 46, and the hook clamp 52 associated therewith may be released so as to thereby enable the rollers to be pivoted outwardly away from the formed surfaces of which they are a part, and in this respect it is to be understood that the broken-line position of the roller R2 illustrated in Fig. 8 is but an intermediate position for the arrangement is such that each roller as R2 may be pivoted into right angular relationship with the formed surface with which it is to cooperate.

It is desirable that uniform pressure be applied and maintained on a sheet of fibrous material and subsequent to the bending thereof, and to this end a thin resilient metallic sheet as 58 is secured to each bar 41 in position to project from this bar past the formed surface associated therewith in the manner in which the sheet 58 is shown connected to the bar 41 in Fig. 1. Each resilient sheet of material as 58 is of greater length than the formed surface as FS2 with which it is to cooperate, and when the roller as R2 associated therewith is in its normal at rest position, the sheet of material 58 extends from the beginning point of the formed surface in such an extent that when the roller R2 is operated in a manner to be explained presently and a bend is formed in a sheet of fibrous material, the sheet 58 will extend beyond the finishing end of the formed surface, as for example to a point such as that whereat the sheet 58 is shown as terminating in Figs. 10 and 11. The manner in which a sheet 58 is utilized will be explained presently, but in this respect it is to be noted that each sheet 58 is disposed intermediate each roller as R2 and a formed surface as FS2 with which such roller is to cooperate, and it will also be noted, by reference to Figs. 10 and 11, that the sheet 58 overlies the face of the sheet of fibrous material opposite that engaged with the formed surface as FS2.

Both heat and pressure are essential in order to effect proper bending of a sheet of fibrous material of the character described hereinabove, and hence each post as 24 has a centrally extending bore as 59, Fig. 2, therein and an electrically-operated heating element is mounted in each such bore, a flange as 61 being provided on the element 60 to be received in an enlarged portion of the bore 59, as shown in Fig. 2, whereby the element 60 is suspended in the bore 59.

Thus when electrical current is supplied to the element 60, it is effective to heat the post as 24 and in this respect it is to be understood that an electrical heating element as 60 is provided in each of the posts included in the present apparatus. It is desirable that each post as 24 be kept at or near a predetermined temperature and consequently I prefer to associate a thermostatic element with each post that will be effective to so control the operation of the heating element as 60 associated therewith that the post as 24 will be heated to, and kept at, a desired temperature. Thus in the present instance I extend a bore 62 through the horizontally extending portion of the flange 17 into the post 24, and the temperature sensing portion 63 of a thermostat, generally indicated by 64, is extended into this bore, the thermostat 64 being screw-threaded into the horizontal flange of the angle strip 17 in the present instance to be supported in the bore 62. The thermostatic element will maintain the circuit closed until a predetermined temperature is reached, whereupon it will function to break the circuit, and the element is also of such a nature that it will function to close the circuit when the temperature falls below a predetermined medium, thermostatic elements of this character being well understood in the art.

In order to insure that heating of each post as 24 will be interrupted so as to thereby prevent scorching and likely damage to a sheet of fibrous material once a desired bend has been produced therein, I associate a normally-closed limit switch as 65 with each post as 24. Each such limit switch includes a plunger as 66 that is effective to open the switch and thereby break the circuit established therethrough when the plunger as 66 is depressed, the plunger desirably being spring urged into an extended position so long as the switch as 65 is to remain closed. Thus in the present instance the switch 65 is mounted on the upper surface of the angle strip 16 in such position as to dispose the plunger 66 thereof in a location such that when the sheet of fibrous material S has been bent about the formed surface as FS2, the plunger 66 will be engaged to thereby break the circuit normally established through the switch 65. By referring to Figs. 10 and 11, it will be seen that the switch as 65 is similarly related to each formed surface provided on the posts at the corners of my apparatus and therefore, as an incident to the completion of each bend in the sheet of fibrous material S, circuit to the heating element in the post providing the formed surface about which the material is bent is broken.

The manner in which the thermostats as 64 and the limit switches as 65 and electrical heating elements as 60 are connected in circuit is shown in Fig. 4 and by referring thereto it will be seen that a conductor 67 extends from the line wire 68 to one end of the winding included in the electrical heating unit 60. A conductor 69 extends from the other end of this winding to one terminal of the thermostat 64 while a conductor 70 leads from the other terminal of the thermostat 64 to one terminal of the switch 65, a conductor 71 connecting the other terminal of the switch 65 to the other line wire 72. As shown in Fig. 4, the heating element thermostat and limit switch associated with each of the aforesaid posts is connected between the line wires 68 and 72 in the above described manner. A switch as 73 will be provided in one of the line wires as 6 so as to enable interruption of operation of the heating elements as 60 when so desired.

As stated hereinabove, the apparatus shown in Figs. 1 to 11 of the accompanying drawings is particularly adapted to form the side walls of a refrigerator cabinet of the top-opening type and when my apparatus is to be used, a sheet of fibrous material such as that described hereinabove is selected which embodies the desired dimensions. This sheet of material when it is to be formed is immersed in water having temperature of from 130° to 150° F. for a period from about forty-five seconds to one minute to thereby moisten and somewhat heat the sheet of fibrous material, and in this respect it will be understood that the fibrous material of the nature to which the present invention pertains is capable of absorbing a small percentage of moisture, particularly when immersed in relatively warm water as desired. It will be evident that higher water temperatures, up to boiling temperature may be used, but I have found that the above stated temperatures give satisfactory results where the bends to be formed in the material are not unusually sharp. In other instances the material may be conditioned for bending by a process of steaming wherein both sides of the sheet in the area which is to be bent are subjected to steam for a period of about thirty seconds, as will hereinafter be described.

Once a sheet of fibrous material has been immersed or otherwise conditioned as aforesaid, it is immediately taken to an apparatus such as that illustrated in the accompanying drawings. At this time each clamp hook as 52 of the apparatus will be released and in the present instance the sheet of fibrous material that is brought to the apparatus is disposed in engagement with the beginning ends of the formed surfaces FS2 and FS3. Moreover, the extent of the fibrous material with reference to these formed surfaces is such that when all the bends desired in the sheet of material have been completed the free edges of the sheet of material will be brought into juxtaposition along a wall opposite that afforded by the portion of the sheet material that extends between the formed surfaces FS2 and FS3 desirably midway in this wall as shown in Fig. 11 where the juncture of the free ends of the fibrous material is indicated by J.

Once the sheet of fibrous material has been arranged in the apparatus as described, the frames carrying the rollers R2 and R3 are pivoted into a position like that in which the roller R2 is shown in Fig. 8, and the clamp hooks 52 adapted to cooperate with the frames carrying these rollers are arranged in the clamping positions thereof in which the clamp hook 52 is shown in Fig. 8. This firmly supports the rollers as R2 in predetermined relation with the formed surfaces with which they are to cooperate and it will be understood that at this time each of the rollers is seated in the recesses 46 and the strip 41 associated therewith. Moreover, it will be understood that at this time each metallic strip as 58 will be disposed between the sheet of fibrous material and each roller as R2. Moreover, prior to the time the sheets of fibrous material are associated with the formed surfaces as FS1 and FS2, the switch as 73 will be closed so that each electrical heating element as 60 will be effective to heat up the posts including the formed surfaces to the desired temperatures, and in this respect I have found that if the posts are maintained within a temperature range of approximately 500° F. to approximately 900° F., satisfactory operation will result.

As soon as the rollers R2 and R3 have been clamped in effective position with a sheet of fibrous material disposed between the resilient sheets 58 and the formed surfaces with which these rollers are to cooperate, the handles as H2 and H3 associated with the rollers R2 and R3 are grasped and the rollers are caused to roll across the resilient metallic plates 58 associated therewith and since these rollers pivot about the vertical axes of the posts on which the formed surfaces as FS2 and FS3 are formed and since such surfaces are also related to such vertical axes, the movement of a roller as R2 from the position thereof shown in Fig. 1 into the position thereof shown in Fig. 10 will be effective to roll the sheet of material over the formed surface as FS2. Inasmuch as the roller is effective on the metallic plate as 58 which in turn is effective upon the sheet of fibrous material and since the point at which the roller will be effective through the plate on the sheet of material will be directly related to the formed surface, it is manifest that the pressure exerted by the roller as R2 on the sheet of fibrous material will be effective at the immediate point of bending, whereby the sheet of fibrous material is not subjected to undue stresses and strains.

It will be appreciated that in the course of movement of a roller as R2 from the position thereof shown in Fig. 1 into the position thereof shown in Fig. 10, the roller advances relative to the cooperating formed surface as FS2 from the beginning to the finishing end of such surface and moreover, in the course of such movement, the sheet of resilient material 52 is effectively applied against and held against the face of the sheet of material being bent opposite that engageable with the formed surface.

As a roller as R2 advances from the beginning to the finishing end of a formed surface as FS2, moisture will be driven from the sheet of material being bent primarily due to the heated condition of the formed surface. Furthermore, by reason of the location of a limit switch as 65 relative to the finishing end of a formed surface as FS2, circuit to the heating element associated with the formed surface will be broken as an incident to the completion of the bend in the sheet of fibrous material. The breaking of a circuit to the heating element associated with such formed surface is effective to interrupt heating of the formed surface and in this way scorching and like damage to the sheet of fibrous material is avoided for as soon as the bend is completed the formed surface commences to cool. Furthermore, when a roller as R2 has reached the end of a formed surface as FS 2, it is desirable that the roller be kept in this position for a period of at least about fifteen seconds, for so to do insures that the bend that has been imparted to the sheet of fibrous material will be retained therein when the sheet of fibrous material has been removed from the apparatus. Furthermore, the provision of resilient plates as 56 assists in this for such plates tend to keep pressure on the sheet of fibrous material throughout the entire bend, and this it has been found assists in insuring that the bend imparted to the fibrous material will be retained therein.

When, as in the present instance, an entire cabinet wall is to be formed from a single sheet of material as soon as the rollers as R2 and R3 have moved into the position in which these rollers are shown in Fig. 10, then the sheet of fibrous material will be extended past the beginning portion of the formed surfaces as FS1 and FS4 and thereupon the rollers as R1 and R4 may be brought into clamping relation with the sheet of fibrous material, these rollers being clamped in this position by clamp hooks 52 in the present instance. Desirably, the rollers as R1 and R4 will be brought into the positions in which they are shown in Fig. 10 immediately after the rollers R2 and R3 have attained the positions in which these rollers are shown in Fig. 10. Furthermore, immediately after this the rollers as R1 and R4 are moved into the positions in which these rollers are shown in Fig. 11, and this completes formation of the cabinet wall which then assumes the position shown in Fig. 11 with the free ends of the sheet of fibrous material in juxtaposed relation as indicated at J, Fig. 1. The rollers as R1 and R4 are desirably retained in the positions in which they are shown in Fig. 11 for a period of about fifteen seconds to insure that the bends formed in the sheet of fibrous material upon operation of these rollers will be retained therein when the bent sheet of fibrous material is removed from the apparatus. Of course, after the elapse of such a period of time each of the roller frames may be released by unclamping the clamp hooks as 52 and thereupon the rollers may be pivoted away from the formed surfaces with which they cooperate, these rollers of course being related to the recesses as 46 and the bars 41 associated therewith prior to the time they are again clamped in cooperative relation with the formed surfaces. After the rollers have been pivoted away from the formed surfaces the bent sheet of fibrous material may be lifted from the apparatus whereupon the limit switches as 65 again close circuit to the heating elements as 60, and subsequently another operation such as that described hereinabove may be repeated. It will be understood that if it were desired, for example, to impart a triangular shape to a sheet of fibrous material, then the three rollers would be required which would be related one to the other to impart the desired configuration to the sheet of fibrous material, and in this instance the various rollers and formed surfaces with which they cooperate would be related one to the other in the manner described hereinabove with reference to the arrangement enabling the sheet of material to be bent so as to afford a four-sided cabinet structure.

It will also be understood that if desired the handles as H1, H2, H3 and H4 might have means associated therewith whereby they could be operated from a common point and, if desired, this could be effected by connecting flexible members to these handles and directing these flexible members to a common point.

The arrangement described hereinabove is one which is particularly adapted for forming a cabinet wall from a single sheet of material and is one which will enable the ends of a sheet of such material to be brought into juxtaposed relation. It will be understood, however, that an apparatus such as that associated with any one of the hereinabove described posts could be utilized alone to form a single bend in a sheet of fibrous material and of course any desired number of devices could be related one to another to thereby afford the desired number of bends in a sheet of fibrous material.

In the embodiment of the invention illustrated in Figs. 12 to 20 a forming machine 100 is provided which is particularly adapted for the formation of ligno-cellulose sheets to the shape required for the construction of refrigerator doors of the character shown in the copending application of Ralph S. Schrandt, Serial No. 438,739, filed April 13, 1942, is now abandoned. The refrigerator doors disclosed in the aforesaid Schrandt application include an outer sheet of ligno-cellulose material which is rounded at its two opposite vertical edges so as to extend rearwardly, thereby to form a continuous surface across the front of the door and across the two vertical side edges of the door. The forming machine 100 as herein shown is arranged to operate upon a sheet of ligno-cellulose material while the sheet is supported in a horizontal plane and in such operation the opposite edge portions of the sheet S—2 are bent about formed surfaces so as to produce a panel or use in constructing refrigerator doors of the aforesaid character.

To this end the forming machine 100 has a rectangular base 101 formed by parallel front and rear angle iron members 102 and 103 which have angle iron spacer members 104 and 105 extended between their ends and connected rigidly thereto by means such as welded joints. A plurality of angle iron legs 106 are secured to the respective corners of the base 101 so as to extend upwardly therefrom and an upper bed 108 is fixed upon the upper ends of the legs 106. The upper bed 108 is also formed from angle iron to provide front and rear members 109 and 110 and end members 111, and these members are preferably welded to each other and to the legs 106, the arrangement being such that the flange 108' of each angle iron member of the upper bed is extended in a horizontal direction over the tops of the legs 106. Thus the flanges 108' afford supporting surfaces upon which certain members of forming means may be secured, while the other flanges 108'' which extend downwardly along the outer faces of the legs 106 afford surfaces upon which other elements of the forming means may be secured.

In providing for the support of a ligno-cellulose sheet S—2 in a horizontal position, a pair of bed plates 116 and 117 are extended between and across the two end members 111 of the upper bed 108, the bar 116 being disposed on one of its edges on the tops of the frame members 111 adjacent to the forward edge of the upper bed 108, while the bar 117 is similarly disposed relatively close to the rear edge of the upper bed 108. The bars 116 and 117 may be secured in place by means such as screws or welding, but in the present instance the desired securing action is attained by an interconnection of elements in a manner which will hereinafter be described in detail. The bars 116 and 117 are secured together by bars 118 and 119 which extend in a direction from front to rear of the machine and are connected to the bars 116 and 117 as by welding. Thus the bars 116 and 117 and the bars 118 and 119 form a unitary grid-like assembly which is rigid in character and which is supported on the members of the upper bed 108. In the present instance this grid-like frame or bed is secured in position at opposite ends by vertically extended plates 120 which are disposed midway between the front and rear edges of the machine and are secured to their respective bars 119 by screws 122 and to the respective end members of the upper bed 108 by screws 124. Since there is a plate 120 at each end of the upper bed 108, the grid-like frame is held rigidly in position. Along the tops of the rails 116 and 117 a plurality of bed plates 126 and 128 are secured and these plates are arranged so that their upper surfaces are in a common plane which also includes the upper surfaces of the bars 118 and 119, and hence the plates 126 and 128 afford a flat surface for supporting a sheet S—2 of ligno-cellulose material.

It will be recalled that it is desired to shape or form the opposite edges of such a sheet so that these edges may afford side edges for a refrigerator door or the like, and to this end formed surfaces FS5 and FS6 are mounted on the upper bed 108 in a rigid and fixed relation to the bed surface provided by the plates 126 and 128. The formed surfaces FS5 and FS6 are provided by tubular members or pipes in substantially the same manner as in the other embodiment of the invention, and these tubular members are rested upon the horizontal upper flanges of the forward and rear members 109 and 110 respectively of the upper bed 108. As shown in detail in Fig. 20 of the drawings, the cylindrical member which provides the formed surface FS5 is longitudinally grooved at 130 and the forward edge of the plate 126 is substantially reduced as at 132 so as to extend into the groove 130. A plurality of screws 134 are extended through the reduced edge 132 and into the cylindrical member which provides the formed surface FS5, and hence this member is held firmly in position in a predetermined relation to the plate 126. It will be observed that the plate 126 is supported at such a height that its upper surface is related tangentially to the surface of the cylindrical member so that when a ligno-cellulose sheet S2 is bent downwardly about the formed surface FS5, the sheet is formed on a radius such that the arcuate portion of the sheet is properly related to the main body of the sheet.

In the operation of the forming machine 100 the ligno-cellulose sheet S2 is clamped upon the bed surface provided by the plates 126 and 128 by a vertically shiftable clamping structure 140 which is movable from its active or clamped position of Fig. 16 to an elevated position shown in Fig. 18 so as to afford clearance space through which the original flat sheet S2 may be inserted and from which the finished or formed sheet may be withdrawn. The clamping structure 140, as is best shown in Figs. 13, 15 and 16, comprises plates 146 and 148 which are positioned over and in opposed relation respectively to the plates 126 and 128, and the plates 146 and 148 are joined by transverse bars or ribs 149, Fig. 13, disposed intermediate the ends of the plates 146 and 148, and by end plates 150. Thus the clamping structure 140 is rigid in character, and this rigid structure is guided for vertical movement between its inactive or retracted position of Fig. 18 and its active or clamped position of Fig. 16 by guide means acting between the stationary plate 120 and the end plates 150 of the clamping structure. Thus each of the end plates 150 has a vertically extending elongated plate 151 secured to its inner surface as will be evident in Figs. 13 and 14 of the drawings, and guide strips 152 secured on the stationary plate 120 engage the side edges of the elongated plates 151, thereby to guide the plates 151 and the clamping structure 140 for vertical movement. Means is provided for actuating the clamping structure 140 between its clamped and unclamped positions and this means as herein shown includes a horizontal rock shaft 154 mounted in bearings 155 secured to the rear legs 106 of the supporting base, and arms 156 fixed to the rock shaft 154 are pivoted at 157 to the lower ends of the elongated plates 151, this pivoted arrangement being provided by a pin and slot connection wherein the pin is fixed to the plates 151, Fig. 14, and these pins are engaged with slots 158, Fig. 18, formed in the arms 156. Since the clamp structure 140 is of a relatively heavy construction, at least one of the arms 156 is extended rearwardly as at 159 and a counterweight 160 is adjustably secured thereto so as to substantially counterbalance the weight of the clamping structure 140. The rock shaft 154 is in the present instance actuated by a forwardly extending foot pedal 161 pivoted at 162 on a bracket 163 mounted on the base 101, and the rear end of the foot pedal 161 is connected by a link 164 to an arm 165 fixed on the rock shaft 154. Thus when the clamping structure 140 is to be raised to its inactive position, the foot pedal 161 is depressed to thereby impart the desired rocking movement to the shaft 154. When the foot pedal is released, the clamping structure 140 returns to its lower position, it being noted that the counterweight 160 may be adjusted along the arm 159 to attain this result.

When the clamping structure 140 is in its lower or clamping position, the requisite clamping force is applied thereto by clamping means acting between the clamping structure 140 and the stationary plates 120. For this purpose a clamping device 167 is provided on the clamping structure 140 adjacent to each end thereof, and each clamping device includes a shaft 168 extended in a direction from front to rear of the machine between upstanding mounting lugs 169 which are provided on the plates 146 and 148. Each shaft 168 has a clamp dog 170 mounted thereon through the medium of an eccentric 171. The nose of the dog 170 is adapted to be disposed beneath an angle bracket 172 fixed on the adjacent face of the stationary plate 120, and when the dog has been thus positioned, the shaft 168 may be rotated by an operating arm 173 to thereby rotate the eccentric and apply clamping force which forces the dog 170 firmly against the angle bracket 172 and correspondingly forces the clamp structure 140 downwardly into firm clamping relation to the sheet S2.

It is essential that the sheet S2 be properly positioned or located in a direction transverse to the axes of the formed surfaces FS5 and FS6, and this must be done before the clamping structure 140 is secured in the position. In the present instance a shiftable gauge device 180 is provided along the forward edge of the machine, this gauge device 180 comprising a gauge plate 181 pivoted on a horizontal axis at 182 by hinge means mounted on forwardly projecting supporting blocks 183 secured to the upper bed 108. The gauge device 180 ordinarily occupies the relation shown in Fig. 16, but when a sheet S2 has been placed in approximately the desired position, the gauge plate may be rotated about its axis 182 into an upstanding relation and the gauge plate is pressed rearwardly into an accurately determined gauge position as shown in Fig. 17. This accurate gauging position is determined by a plurality of pins 185 which are mounted on the gauge plate 181 in such a relation that when the gauge plate is rotated to its upper position, the gauge pins 185 will engage the formed surface FS5 in a radial relation thereto. The sheet S2 may then be manipulated so that it properly engages the gauge plate 181 after which the gauge device 180 may be withdrawn and dropped to its normal position of Fig. 16, and the operator may then proceed with the clamping of the sheet S2.

After a sheet S2 has been clamped in position as aforesaid, the opposite edges thereof may be pressed or formed to a configuration which conforms with the surfaces FS5 and FS6, and this is accomplished by rollers R5 and R6 which are adapted to cooperate respectively with the formed surfaces FS5 and FS6. The rollers R5 and R6 are supported for operative movement along paths which are concentric with the formed surfaces with which they are to cooperate, and in attaining this end the supporting means for the rollers R5 and R6 are arranged so that the rollers are moved to retracted positions at the same time when the clamping structure 140 is elevated. For this purpose a cross arm 190 is secured on each of the movable plates 151, this securing action being attained by screws 191 as shown in Figs. 15 and 16. The cross arms 190 extend in opposite direction from the plate 151 to points beyond the vertical planes passing respectively through the axes of the formed surfaces FS5 and FS6, and supporting arms 194 and 195 are pivoted by pivot pins 196 on the opposite ends of each of the cross arms 190. The pivots 196 are so disposed as to lie in the respective planes which pass through the axes of the formed surfaces FS5 and FS7, and are so arranged that when the clamp structure 140 is in its lower position as shown in Fig. 15, the pivot pins 196 are disposed in a concentric relation with the axes of the related formed surfaces FS5 and FS6.

The roller R5 has trunnions 198, Fig. 12, extended from its opposite ends and these trunnions are supported in bearings 199 carried on the arm 194. The bearings 199 are so disposed that the lower surface of the roller R5 is disposed substantially in the plane of the lower surface of the plate 146, and hence when the clamp structure 140 is secured in its active relation, the roller R5 will be in such a position as to apply clamping force to the sheet S2 to clamp the same against the formed surface FS5. In the present construction, however, a relatively thin and bendable metal protecting plate or sheet 200 is secured on the lower surface of the plate 146 so as to extend forwardly across the surface of a sheet S2 and beyond the edge thereof, it having been found that such a protecting sheet 200 avoids possibility of damage to the surface of the sheet S2 during the forming operation. When such a sheet 200 is employed, the location of the axis of the roller R5 is spaced a somewhat greater distance from the axis of the pivot pins 196. A similar protecting sheet of bendable metal indicated at 201 is mounted on the plate 148 so as to extend rearwardly therefrom as an extension of the lower surface thereof and the roller R6 is supported on the arms 195 by bearings 202 which are similar to the bearings 199.

Thus when a sheet S2 has been clamped in position by the clamping structure 140, the two rollers R5 and R6 may be drawn downwardly about the axes defined by the pivot pins 196 to press the sheet S2 into the desired formed relation about the formed surfaces FS5 and FS6. Preferably such actuation of the rollers R5 and R6 is accomplished in unison, and to attain this result, motion transmitting means is interposed between the arms 194 and 195 which serve to support the rollers R5 and R6 respectively. In the embodiment herein shown this end is attained by a pair of vertical slide plates 210, one of which is mounted at each end of the machine. Thus as shown in Figs. 13 and 14, the right hand slide plate 210 is mounted for vertical sliding movement in the guideway which is provided on the end plate 150 of the upper clamping structure. This guideway comprises a base plate 211 and side members 212 which are angular in cross section and overlie the reduced edges of the slide plate 210. The slide plate 210 has links 215 pivoted in similar positions thereon and these links extend in generally opposite directions and are connected by pivoted pins 216 to the levers or arms 194 and 195 respectively. The pivot pins 216 are disposed at the ends of the levers 194 and 195 which are opposite from the bearings 199 and 202, and hence the arms 194 and 195 are constrained, through the links 215 and the slide plate 210, to move in unison. While the desired actuating force for moving the arms 194 and 195 and the rollers R5 and R6 might be applied to the slide plate 210, I have, in the present instance provided a bail-like handle H5 on the arms 194 whereby these arms may be actuated, and the resulting motion is transmitted through the slide 210 to the arms 195.

When the forming machine 200 is in use, the formed surfaces FS5 and FS6 are maintained in a heated condition by means such as heating elements 220, Figs. 16 and 20, these heating elements in the present instance being electrical in character, and the desired temperature may be automatically maintained as in the other embodiment of the invention by thermostatic switch means. The heating elements 220 may also be controlled by cut-off switches which disconnect the current when the bending operation has been completed, as in the other embodiment of the invention.

When a sheet of ligno-cellulose material is to be operated upon by the forming machine 100, the sheet is conditioned for the forming operation by the application of heat and moisture to at least those portions of the sheet which are to undergo distortion during the forming operation. This may be accomplished by immersion of the sheet in warm water as hereinbefore described, or by a steaming process. In such a steaming process I preferably utilize steam pipes disposed opposite both faces of the areas which are to be bent or distorted, and openings are provided in the steam pipes to discharge the steam against the surfaces of the sheet. Preferably the steam pipes have housings thereabove which engage the surfaces of the sheet to confine the steam to the desired areas of such surfaces, and after steam has been applied to the sheet for a period of from 15 to 30 seconds, the housings are separated to permit withdrawal of the sheet. The sheet is then transferred to the machine 100, the clamping structure 140 being elevated by the pedal 161 to its elevated position of Fig. 18. The sheet S2 is inserted in a rearward direction so as to be disposed between the lower bed 108 and the clamping structure 140, and after the sheet has been accurately positioned by the gauge device 180, the clamp structure 140 is shifted to its lower position and clamping force is applied through by the clamp devices 167. The rollers R5 and R6 are then operated in unison through actuation of the handle H5, and the sheet is gradually bent about and pressed against the formed surfaces FS5 and FS6. When the rollers R5 and R6 have reached their lower positions, as shown in Figs. 19 and 20, the forming operation is complete, but the rollers are maintained in this position so as to maintain the sheet S2 under pressure throughout the formed portion for a short period of about 15 seconds, it being noted that the bendable plates or sheets 200 and 201 cooperate with the rollers R5 and R6 during this period to apply pressure to the formed surfaces of the sheet. When the rollers R5 and R6 are returned to their upper positions of Fig. 16 after a forming operation as aforesaid, the sheet S2 will retain the form to which it has been bent, and the clamping devices 167 may therefore be released and the clamping structure 140 may be elevated to the position of Fig. 18, thereby to provide clearance space through which the formed sheet S2 may be withdrawn.

From the foregoing it will be apparent that the present invention enables ligno-cellulose sheets and the like to be conveniently and accurately formed so as to afford relatively sharp or short radius bends therein, thereby to enable such sheets to be utilized as structural elements of cabinets, refrigerators and the like. Such formation of the ligno-cellulose sheets is accomplished under this invention without breaking or cracking of the surfaces of the sheets, and hence these formed sheets may be used as the outer casing members to afford finished and unbroken or unseamed surfaces for such cabinets.

Hence, while I have illustrated and described preferred embodiments of my invention, it is to be understood that these are capable of variation and modification and I therefore do not wish to be limited to the precise details set forth, but desire to avail myself of such changes and alterations as fall within the purview of the following claims.

I claim:

1. In a machine for forming relatively short-radius bends in ligno-cellulose and like sheets, means providing a formed surface of arcuate shape having a radius equal to the desired radius of the inner surface of the bend to be formed in a ligno-cellulose and like sheet, means providing a clamping surface merging with said formed surface in tangential relation thereto, a clamping member for clamping such a sheet against said clamping surface with a portion of the sheet extending beyond said clamping surface and in a tangential relation to said formed surface, and means carried by said clamping member and movable relative thereto to bend the extending portion of such a sheet into contact with said formed surface.

2. In a machine for forming relatively short-radius bends in ligno-cellulose and like sheets, means providing a formed surface of arcuate shape having a radius equal to the desired radius of the inner surface of the bend to be formed in a ligno-cellulose and like sheet, means providing a clamping surface merging with said formed surface in tangential relation thereto, a clamping member for clamping such a sheet against said clamping surface with a portion of the sheet extending beyond said clamping surface and in a tangential relation to said formed surface, a pressure roller, and means supporting said pressure roller on said clamping member for operative movement along a path centered on the axis of said formed surface to press the extending portion of the sheet into engagement with said formed surface.

3. In a machine for forming relatively short-radius bends in ligno-cellulose and like sheets, means providing a formed surface of arcuate shape having a radius equal to the desired radius of the inner surface of the bend to be formed in a ligno-cellulose and like sheet, means providing a clamping surface merging with said formed surface in tangential relation thereto, a clamping member for clamping such a sheet against said clamping surface with a portion of the sheet extending beyond said clamping surface and in a tangential relation to said formed surface, means for heating said formed surface to substantially a predetermined temperature, a pressure roller, and means supporting said pressure roller on said clamping member for operative movement along a path centered on the axis of said formed surface to press the extending portion of the sheet into engagement with said formed surface.

4. In a machine for forming relatively short-radius bends in ligno-cellulose and like sheets, means providing a formed surface of arcuate shape having a radius equal to the desired radius of the inner surface of a bend to be formed in a ligno-cellulose and like sheet, means providing a clamping surface merging with said formed surface in tangential relation thereto, a clamping member for clamping such a sheet against said clamping surface with a portion of the sheet extending beyond said clamping surface and in a tangential relation to said formed surface, a pair of arms pivoted on said clamping member for movement about an axis which is disposed on the axis of said arcuate formed surface when said clamping member is in clamping relation to said clamping surface, and a pressure roller supported on said arms in spaced relation to the pivotal axis thereof for operative movement along a path centered on the axis of said formed surface to press the extending portion of the sheet into engagement with said formed surface.

5. In a machine for forming relatively short-radius bends in ligno-cellulose and like sheets, means providing a formed surface of arcuate shape having a radius equal to the desired radius of the inner surface of the bend to be formed in a ligno-cellulose and like sheet, means providing a clamping surface merging with said formed surface in tangential relation thereto, a clamping member for clamping such a sheet against said clamping surface with a portion of the sheet extending beyond said clamping surface and in a tangential relation to said formed surface, means carried by said clamping member and movable relative thereto to bend the extending portion of such a sheet into contact with said formed surface, and means for heating said formed surface while the sheet is being thus bent into contact therewith.

6. In a machine for forming relatively short-radius bends in ligno-cellulose and like sheets, means providing a formed surface of arcuate shape having a radius equal to the desired radius of the inner surface of the bend to be formed in a ligno-cellulose and like sheet, means providing a clamping surface merging with said formed surface in tangential relation thereto, a clamping member for clamping such a sheet against said clamping surface with a portion of the sheet extending beyond said clamping surface and in a tangential relation to said formed surface, a relatively thin and bendable sheet carried on said clamping member in position to engage such an extending portion of a sheet when said clamping member is in clamping position, a pressure roller, and means supporting said pressure roller on said clamping member for operative movement along a path centered on the axis of said formed surface to move said roller over said bendable sheet to press the extending portion of the ligno-cellulose or like sheet into engagement with said formed surface.

7. In a machine for forming relatively short-radius bends in ligno-celulose and like sheets, means providing a formed surface of arcuate shape having a radius equal to the desired radius of the inner surface of the bend to be formed in a ligno-cellulose and like sheet, means providing a clamping surface merging with said formed surface in tangential relation thereto, a clamping member for clamping such a sheet against said clamping surface with a portion of the sheet extending beyond said clamping surface and in a tangential relation to said formed surface, a pair of arms pivoted on said clamping member for movement about an axis which is disposed on the axis of said arcuate formed surface when said clamping member is in clamping relation to said clamping surface, a pressure roller supported on said arms in spaced relation to the pivotal axis thereof for operative movement along a path centered on the axis of said formed surface to press the extending portion of the sheet into engagement with said formed surface, and a protective sheet of bendable metal carried by said clamping member in position to transmit bending force from said roller to the extending portion of the ligno-cellulose or like sheet.

8. In a machine for forming relatively short-radius bends in ligno-cellulose and like sheets, a pair of elongated members supported for relative clamping and separating movement and between which a ligno-cellulose or like sheet may be clamped, means rigidly associated with one of said members and providing a formed surface of arcuate shape having a radius equal to the desired radius of the inner surface of the bend to be formed in a ligno-cellulose and like sheet, a pair of arms pivoted on the other of said members for movement about an axis which is disposed on the axis of said arcuate formed surface when said elongated members are in said clamping relation, and a pressure roller supported on said arms in spaced relation to the pivotal axis thereof for operative movement along a path centered on the axis of said formed surface to press an extending portion of the sheet into engagement with said formed surface.

9. In a machine for shaping a single sheet of ligno-cellulose or like material to form a four-sided wall assembly having the walls thereof joined by integral rounded corners, a plurality of elongated posts, each having a rounded outer corner surface affording a formed surface conforming with the desired form of the inner surfaces to be formed, means supporting said posts in a rigid and parallel relation such that said rounded outer corners of the posts are located in positions conforming to the locations of the inner surfaces of the rounded corners to be formed, an elongated carrier structure allocated to each post, each carrier structure including an elongated clamp bar, a pair of arms pivoted on a common axis on the clamp bar adjacent opposite ends of the bar, and a pressure roller mounted between the pair of arms, means pivoting each clamp bar adjacent to one end of the related post for movement of the carrier structure from an out-of-the-way position substantially perpendicular to the related post to an active clamping position wherein said bar is parallel to the post to which it is allocated, the pivoted axis of the pivoted arms being concentric with the axis of the formed surface of the related post when the clamp bar is in its active clamping position, and means for securing said clamp bars in said active clamping positions.

10. In a machine for shaping a single sheet of ligno-cellulose or like material to form a four-sided wall assembly having the walls thereof joined by integral rounded corners, a base, a plurality of elongated posts extended upwardly from said base at points located at the corners of a rectangle, said posts having rounded outer corners affording formed surfaces conforming to the desired form of the inner surfaces of the rounded corners to be formed, an elongated carrier structure allocated to each post, each carrier structure including an elongated clamp bar, a pair of arms pivoted on a common axis on the clamp bar adjacent opposite ends of the bar, and a pressure roller mounted between the pair of arms, means pivoting the lower end of each clamp bar on said base for movement of the carrier structure from a substantially horizontal out-of-the-way position to an active clamping position wherein said bar is parallel to the post to which it is allocated, the pivotal axis of the pivoted arms being concentric with the axis of the formed surface of the related post when the clamp bar is in its active clamping position, and means for securing said clamp bars in said active clamping positions.

11. In a machine for shaping a single sheet of ligno-cellulose or like material to form a four-sided wall assembly having the walls thereof joined by integral rounded corners, a base, a plurality of elongated posts extended upwardly from said base at points located at the corners of a rectangle, said posts having rounded outer corners affording formed surfaces conforming to the desired form of the inner surfaces of the rounded corners to be formed, an elongated carrier structure allocated to each post, each carrier structure including an elongated clamp bar, a pair of arms pivoted on a common axis on the clamp bar adjacent opposite ends of the bar, and a pressure roller mounted between the pair of arms, means pivoting the lower end of each clamp bar on said base for movement of the carrier structure from a substantially horizontal out-of-the-way position to an active clamping position wherein said bar is parallel to the post to which it is allocated, the pivotal axis of the pivoted arms being concentric with the axis of the formed surface of the related post when the clamp bar is in its active clamping position, means for securing said clamp bars in said active clamping positions, individual means for heating said posts to normally maintain the same within a predetermined temperature range, and individual means associated with each post for rendering the heating means of the respective posts inoperative when a sheet has been bent around the formed surface of a post.

12. In a machine for shaping a sheet of ligno-cellulose and like material to provide a wall panel having integral rounded corners at opposite edges thereof, a stationary supporting bed upon which such a sheet may be positioned, a pair of elongated forming elements each having an arcuate formed surface thereon and extending longitudinally thereof, means supporting said forming elements in a predetermined parallel relation along opposite edges of said bed so that the formed surfaces thereof are related to each other in the relation desired for the inner surfaces of the rounded corners of the wall panel that is to be formed, a clamping structure mounted in opposed relation to said bed for clamping portions of such a sheet against said bed and against said forming elements adjacent to said formed surfaces, and pressure means mounted on said clamping structure and operable to bend projecting edge portions of such a sheet into engagement with said formed surfaces.

13. In a machine for shaping a sheet of ligno-cellulose and like material to provide a wall panel having integral rounded corners at the opposite edges thereof, a stationary supporting bed upon which such a sheet may be positioned, a pair of elongated forming elements each having an arcuate formed surface thereon and extending longitudinally thereof, means supporting said forming elements along opposite edges of said bed and in a predetermined parallel relation to each other such that the formed surfaces thereof are related to each other in the relation desired for the inner surfaces of the rounded corners of the connected walls that are to be formed, a clamping structure mounted for movement into a clamping relation to said bed for clamping portions of such a sheet against said bed and against the forming elements adjacent to said formed surfaces, and individual pressure rollers for co-operation with the respective formed surfaces, and means mounted on said clamping structure for moving said pressure rollers in unison along paths concentric with their respective formed surfaces to press extending edge portions of the sheet against the related formed surfaces.

14. In a machine for shaping a sheet of ligno-cellulose and like material to provide a wall panel having integral rounded corners at the opposite edges thereof, a stationary supporting bed upon which such a sheet may be positioned, a pair of elongated forming elements each having an arcuate formed surface thereon and extending longitudinally thereof, means supporting said forming elements along opposite edges of said bed and in a predetermined parallel relation to each other such that the formed surfaces thereof are related to each other in the relation desired for the inner surfaces of the rounded corners of the connected walls that are to be formed, a clamping structure mounted for movement into a clamping relation to said bed for clamping portions of such a sheet against said bed and against the forming elements adjacent to said formed surfaces, and individual pressure rollers for co-operation with the respective formed surfaces, a gauge device mounted on said bed for locating a sheet thereon, and means mounted on said clamping structure for moving said pressure rollers in unison along paths concentric with their respective formed surfaces to press extending edge portions of the sheet against the related formed surfaces.

P. H. ESBJORNSON.

REFERENCES CITED

The following references are of record in the file of this patent:

UNITED STATES PATENTS

| Number | Name | Date |
|---|---|---|
| 92,187 | Hamm | July 6, 1869 |
| 784,471 | Church | Mar. 7, 1905 |
| 843,854 | Waterman | Feb. 12, 1907 |
| 1,508,866 | Williams | Sept. 16, 1924 |
| 1,606,271 | Stratford | Nov. 9, 1926 |
| 1,642,657 | Frick | Sept. 13, 1927 |
| 1,754,549 | Elliott | Apr. 15, 1930 |
| 1,760,288 | Stevens | May 27, 1930 |
| 1,769,570 | Groehn et al. | July 1, 1930 |
| 1,856,319 | Cooper | May 3, 1932 |
| 2,289,685 | Schoen | July 14, 1942 |
| 2,382,807 | Nobles | Aug. 14, 1945 |

FOREIGN PATENTS

| Number | Country | Date |
|---|---|---|
| 650,680 | France | Sept. 25, 1928 |